US012578938B2

(12) United States Patent
Cohen

(10) Patent No.: US 12,578,938 B2
(45) Date of Patent: Mar. 17, 2026

(54) EXPLOIT PREVENTION BASED ON GENERATION OF RANDOM CHAOTIC EXECUTION CONTEXT

(71) Applicant: Seraphic Algorithms Ltd., Tel-Aviv (IL)

(72) Inventor: Avihay Cohen, Tiberias (IL)

(73) Assignee: SERAPHIC ALGORITHMS LTD, Tel-Aviv (IL)

( * ) Notice: Subject to any disclaimer, the term of this patent is extended or adjusted under 35 U.S.C. 154(b) by 192 days.

(21) Appl. No.: 18/043,239

(22) PCT Filed: Feb. 25, 2022

(86) PCT No.: PCT/IB2022/051688

§ 371 (c)(1),
(2) Date: Feb. 27, 2023

(87) PCT Pub. No.: WO2023/031678

PCT Pub. Date: Mar. 9, 2023

(65) Prior Publication Data

US 2025/0077198 A1     Mar. 6, 2025

Related U.S. Application Data

(63) Continuation-in-part of application No. PCT/IL2021/051063, filed on Aug. 31, 2021.

(60) Provisional application No. 63/072,289, filed on Aug. 31, 2020.

(51) Int. Cl.
G06F 8/40        (2018.01)
G06F 8/41        (2018.01)

(52) U.S. Cl.
CPC .................................... *G06F 8/41* (2013.01)

(58) Field of Classification Search
CPC .......... G06F 8/41; G06F 21/00; G06F 21/566
See application file for complete search history.

(56) References Cited

U.S. PATENT DOCUMENTS

2015/0039864 A1    2/2015  Tobin
2015/0040223 A1    2/2015  Tobin
2015/0047049 A1    2/2015  Panchenko et al.
(Continued)

OTHER PUBLICATIONS

International Search Report and Written Opinion in Application No. PCT/IB22/51688 dated May 11, 2022 (14 pages).
(Continued)

*Primary Examiner* — Hanh Thi-Minh Bui
(74) *Attorney, Agent, or Firm* — FINNEGAN, HENDERSON, FARABOW, GARRETT & DUNNER LLP

(57)        ABSTRACT
A non-transitory computer readable medium containing instructions that when executed by at least one processor cause the at least one processor to perform cybersecurity operations. The cybersecurity operations may involve determining that an operating system has initiated a computing process, and replacing the computing process with a code configured to create a map representing a structure of an original binary image associated with the replaced computing process. A modified execution context may be generated for the computing process and the original binary image may be recompiled into an execution binary image compatible with the modified execution context. The computing process may then be executed using the execution binary image and the map.

20 Claims, 7 Drawing Sheets

(56) References Cited

U.S. PATENT DOCUMENTS

| | | |
|---|---|---|
| 2016/0171212 A1 | 6/2016 | Majumdar et al. |
| 2018/0075238 A1 | 3/2018 | Ferrie |
| 2018/0260559 A1 | 9/2018 | Jarrous et al. |
| 2020/0073826 A1* | 3/2020 | Tsirkin ................ G06F 9/30101 |

OTHER PUBLICATIONS

Larsen et al., SoK: Automated Software Diversity. In 2014 IEEE Symposium on Security and Privacy (pp. 276-291). IEEE, May 2014 [retrieved on Apr. 17, 2022]. Retrieved from the Internet: <https://cse.usf.edu/~xou/sec15/software_diversity.pdf>; entire document.
International Search Report and Written Opinion in Application No. PCT/IL2021/051063 dated Nov. 15, 2021 (8 pages).
Extended European Search Report in Europen Patent Application No. 228673710.4 dated Apr. 3, 2025 (8 pages).

* cited by examiner

FIG. 3A x86 CPU INSTRUCTION STREAM              BINARY MAP

```
    ...
   movl $0, %eax
   addl %eax, %ebx
   popl %eax
   looptop:
=> imul %edx
   andl $0xFF, %eax
   cmpl $100, %eax
   jb looptop
   leal 4(%esp), %ebp
   movl %esi, %edi
   subl $8, %edi
   shrl %cl, %ebx
   movw %bx, -2(%ebp)
   ...
```

| OPCODE TYPE | OPERANDS VALUE/TYPE | LOCATION OFFSET |
|---|---|---|
| OPCODE TYPE | OPERANDS VALUE/TYPE | LOCATION OFFSET |
| OPCODE TYPE | OPERANDS VALUE/TYPE | LOCATION OFFSET |
| OPCODE TYPE | OPERANDS VALUE/TYPE | LOCATION OFFSET |

FIG. 3B

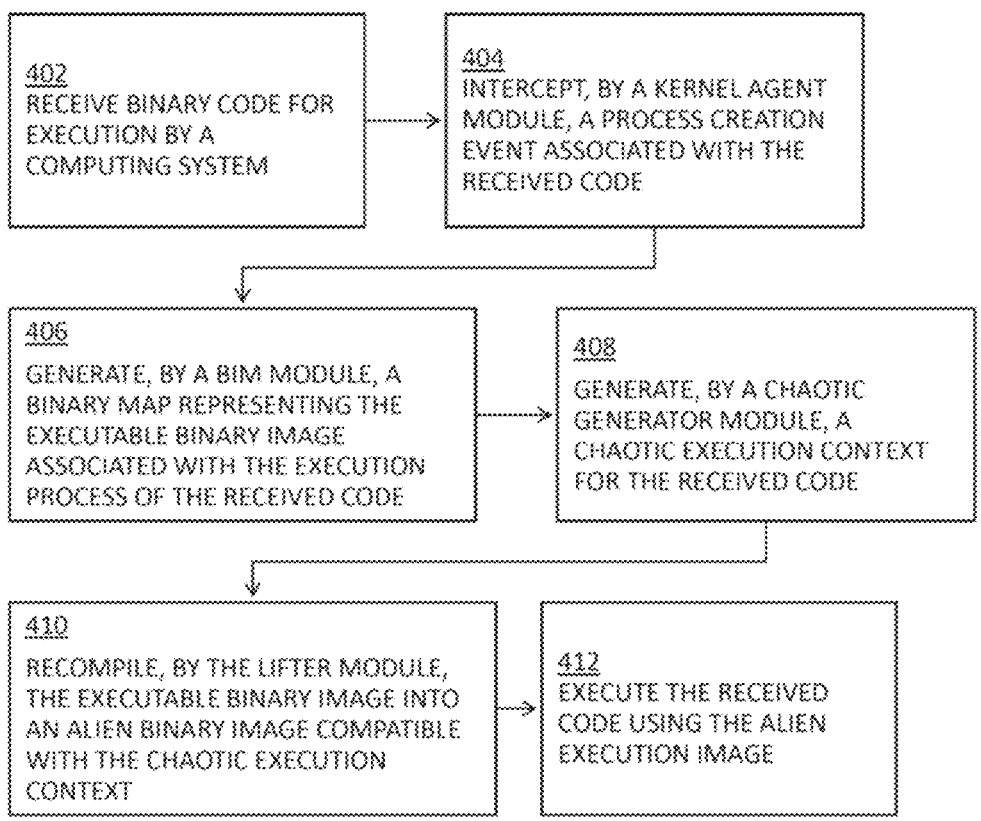

402
RECEIVE BINARY CODE FOR EXECUTION BY A COMPUTING SYSTEM

404
INTERCEPT, BY A KERNEL AGENT MODULE, A PROCESS CREATION EVENT ASSOCIATED WITH THE RECEIVED CODE

406
GENERATE, BY A BIM MODULE, A BINARY MAP REPRESENTING THE EXECUTABLE BINARY IMAGE ASSOCIATED WITH THE EXECUTION PROCESS OF THE RECEIVED CODE

408
GENERATE, BY A CHAOTIC GENERATOR MODULE, A CHAOTIC EXECUTION CONTEXT FOR THE RECEIVED CODE

410
RECOMPILE, BY THE LIFTER MODULE, THE EXECUTABLE BINARY IMAGE INTO AN ALIEN BINARY IMAGE COMPATIBLE WITH THE CHAOTIC EXECUTION CONTEXT

412
EXECUTE THE RECEIVED CODE USING THE ALIEN EXECUTION IMAGE

FIG. 4

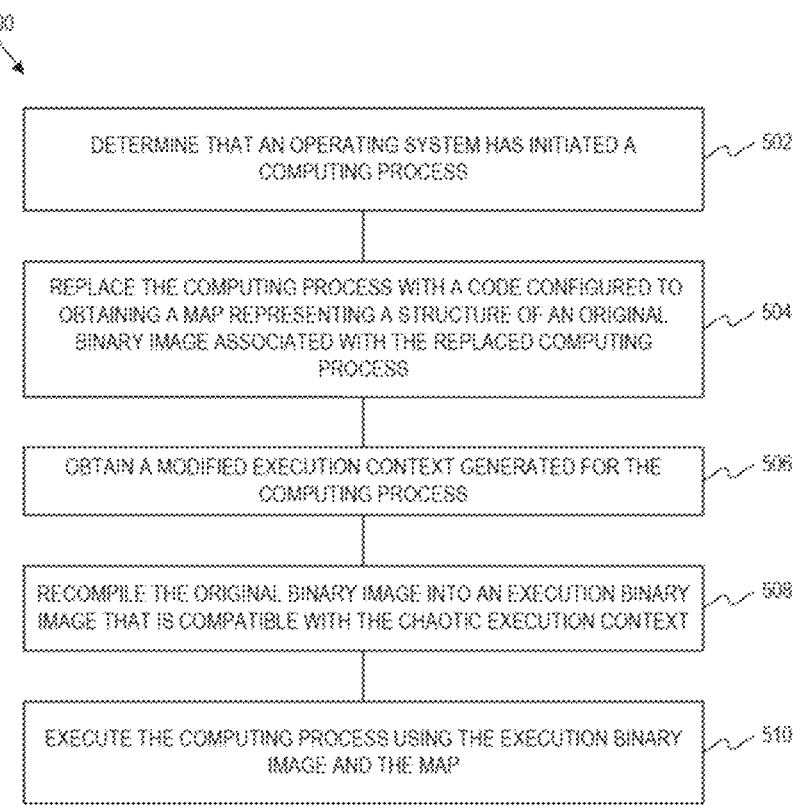

500

DETERMINE THAT AN OPERATING SYSTEM HAS INITIATED A COMPUTING PROCESS ⟶ 502

REPLACE THE COMPUTING PROCESS WITH A CODE CONFIGURED TO OBTAINING A MAP REPRESENTING A STRUCTURE OF AN ORIGINAL BINARY IMAGE ASSOCIATED WITH THE REPLACED COMPUTING PROCESS ⟶ 504

OBTAIN A MODIFIED EXECUTION CONTEXT GENERATED FOR THE COMPUTING PROCESS ⟶ 506

RECOMPILE THE ORIGINAL BINARY IMAGE INTO AN EXECUTION BINARY IMAGE THAT IS COMPATIBLE WITH THE CHAOTIC EXECUTION CONTEXT ⟶ 508

EXECUTE THE COMPUTING PROCESS USING THE EXECUTION BINARY IMAGE AND THE MAP ⟶ 510

FIG. 5

EXPLOIT PREVENTION BASED ON GENERATION OF RANDOM CHAOTIC EXECUTION CONTEXT

CROSS-REFERENCE TO RELATED APPLICATIONS

This application is a U.S. national phase entry under 35 U.S.C. § 371 of International Patent Application No. PCT/IB2022/051688, filed on Feb. 25, 2022 which claims priority from International Application No. PCT/IL2021/051063, field on Aug. 31, 2021, which claims priority from U.S. Provisional Patent Application No. 63/072,289, filed Aug. 31, 2020 the content of all of which are incorporated by reference herein in their entirety.

TECHNICAL FIELD

Disclosed embodiments relate to the field of cyber defense, and more specifically to exploit prevention and malicious code neutralization during execution of applications within an operating system environment.

BACKGROUND

Computers are typically configured with an operating system (OS) to manage computing hardware and software resources, such as for application software running on the computer. The OS may interface with a user, e.g., via a graphical user interface (GUI) and additionally with system resources, such as to oversee task scheduling, memory management, disk access and file systems, and interfaces with peripheral devices.

A computer's architecture may define the functionality, organization, and implementation for the computer. The computer architecture may include an instruction set architecture (ISA) to interface between the hardware and the software of the computer system. The ISA may define how the processor of the computer executes software by defining data types, registers, memory management, and a set of executable instructions. The ISA may define software execution behavior in a manner that is independent of specific hardware characteristics, allowing for software compatibility across different hardware configurations.

Typically, processors have a fixed instruction set that persists across threads, processes, operating systems, and devices. For example, Intel's® x86 instruction set operates similarly for the entire x86 family of processors, allowing for development of software independently of hardware. However, this uniformity may also present a single point of failure should an attacker discover a vulnerability as the attacker may exploit the same vulnerability across different hardware devices.

One defense technique is Moving Target Defense (MTD) which may dynamically reconfigure a system parameter to confuse attackers and inhibit them from knowing the state of the computer system. However, an attacker may circumvent an MTD by predicting the system reconfiguration.

Another defense technique is Instruction Set Randomization (ISR) which typically encrypts executable code using a secret encryption key. Before an instruction is executed, it is decrypted with the secret key. Malicious code injected by an attacker lacking the key is also encoded with the secret key prior to execution, rendering the malicious code ineffective. However, ISR do not defend against code reuse attacks, which stitch together existing code snippets of a running process to launch an attack.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, computer readable media and methods which are meant to be exemplary and illustrative, not limiting in scope.

There is provided, in accordance with an embodiment, a non-transitory computer readable medium containing instructions that when executed by at least one processor cause the at least one processor to perform cybersecurity operations comprising: determining that an operating system has initiated a computing process; replacing the computing process with a code configured to create a map representing a structure of an original binary image associated with the replaced computing process; generating a modified execution context for the computing process; recompiling the original binary image into an execution binary image compatible with the modified execution context; and executing the computing process using the execution binary image and the map.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 3A and 3B, taken together, schematically depict a process of extracting relevant data from a binary image and generating a binary map, in accordance with some embodiments of the present disclosure.

FIG. 4 illustrates a flowchart of functional steps in a method for automated neutralizing of malicious code on a computer system, in accordance with some embodiments of the present disclosure.

FIG. 5 illustrates a flowchart of a method for performing cybersecurity operations, consistent with some embodiments of the present disclosure.

DETAILED DESCRIPTION

Figure 1:
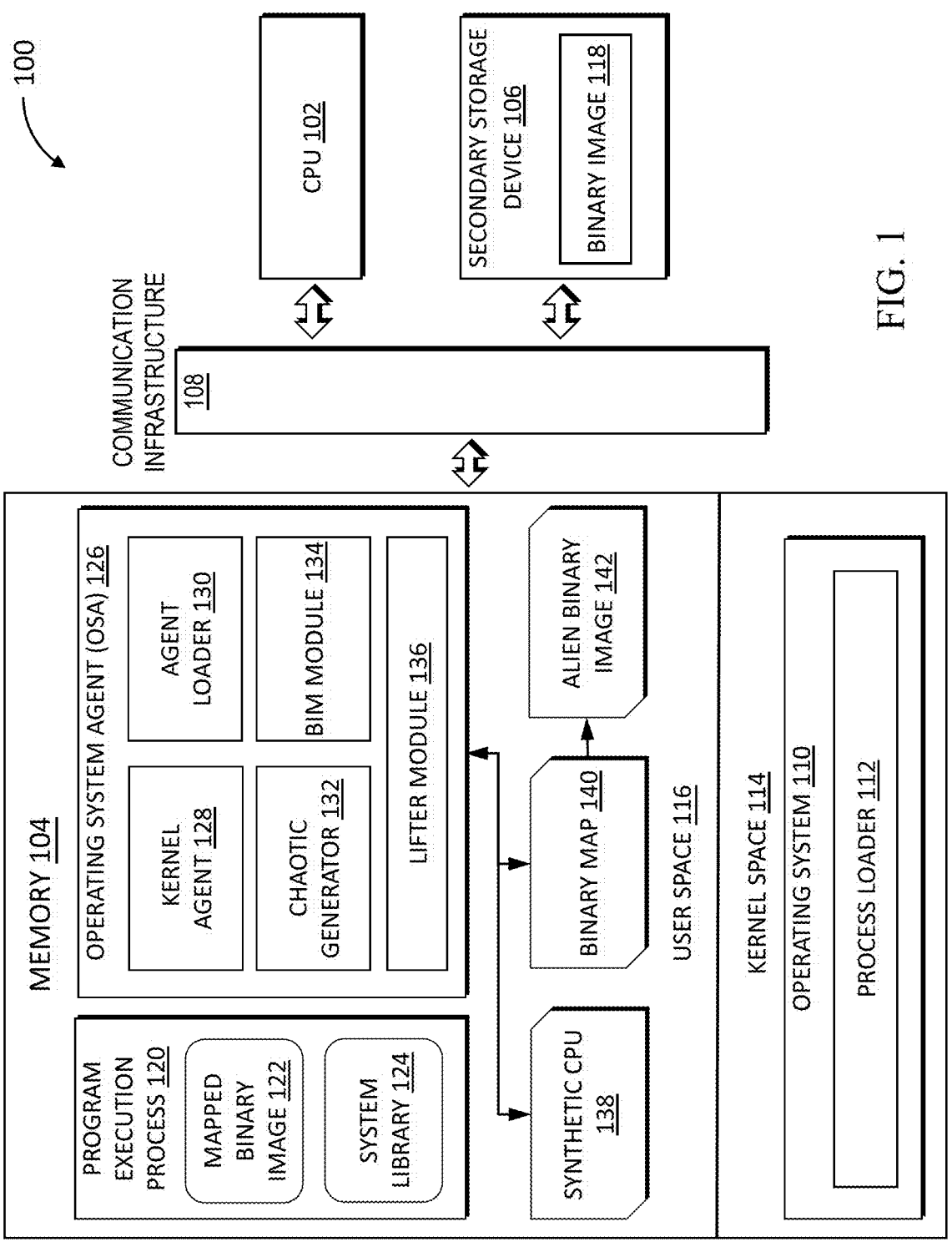
FIG. 1 depicts in a static mode components of an exemplary computer system for preventing exploitations and neutralizing the execution of malicious code associated with a computing process executing thereon, in accordance with some embodiments of the present disclosure.

Disclosed herein are embodiments for neutralizing cybersecurity exploits on a computer system. A runtime environment for a computer system may exhibit one or more predictable characteristics, such as may be inherent to the architecture (e.g., ISA) of the computer and/or the operating system (OS) configured with the computer. These predictable characteristics may expose vulnerabilities that are exploitable in a cybersecurity attack. For example, when developing an attack vector, an attacker may rely on knowledge of specific runtime activities of the OS and ISA configured with a computer and exploit these specific runtime activities to launch an attack, e.g., by injecting malicious code that exploits the runtime environment. Embodiments are thus disclosed to disrupt one or more predictable aspects of the runtime environment, for example by modifying the runtime environment to introduce one or more unpredictable and/or chaotic characteristics. The present disclosure thus provides for various approaches for exploit prevention and malicious code neutralization within an operating system environment.

Malicious code, such as shell code, may attempt to access system functions to carry out various malicious actions. For example, shellcode may access system functions directly via assembly instructions. To carry out this intent, malicious code may rely on certain assumptions regarding a runtime execution context of a targeted computing device, relating to proper initialization and execution of the payload. For example, exploits performed by malicious code may be carried out by identifying a memory location of a procedure or data object having a predetermined fixed address in the address space of a process in memory. The malicious code may use this location to calculate locations for other procedures required by the exploit.

In some disclosed embodiments, an operating system agent (OSA) is provided that is capable of executing a received binary code in a chaotic manner. The OSA may prevent a malicious code relying on assumptions regarding the runtime execution context from performing its malicious intent, while allowing legitimate code to execute as intended.

In some disclosed embodiments, a real-time alien execution context is provided, which may execute received binary code. In some embodiments, the alien execution context may include an emulated software-based "synthetic" central processing unit (CPU), an alien information system (IS), alien instruction set, alien registers, and/or a scattered memory layout. In some embodiments, an alien binary program image generator (e.g., program executable generator) may be provided to convert a received binary code into a chaotic execution version to match the alien execution context.

In some disclosed embodiments, legitimate, non-malicious, received code may execute as intended, whereas malicious received code attempting to exploit a software feature may fail to perform its malicious intent. For example, an attempt to inject shellcode may fail to execute, because the shell code will be unknown to an emulated software-based 'synthetic' CPU. Similarly, a malicious payload attempting techniques such as return oriented programming (ROP) and/or jump oriented programming (JOP) may fail, because the generated chaotic execution context may not include a predictable, thus exploitable, aspect (e.g., operating system behavior, operating system function, memory trait, or memory behavior).

Some disclosed embodiments may be software-based and may not require any specific hardware support. In some embodiments, an overall impact on the system's performance may be relatively low. In some embodiments, prior knowledge of malicious code may not be assumed, and the prevention of new, unknown, or zero-day attacks may be possible.

As used herein, a 'program,' 'application,' or 'code' may refer broadly to program code as well as associated data that is stored in a file. A 'process' or 'execution' may refer to executing the program or code on a computer, and a process may comprise the program plus its execution context.

An 'execution context' as used herein may include among other things, a state of the processor (processor context), e.g., a value of its program counter, and registers; as well as a memory map for the process, e.g., identified regions of memory that have been allocated for the process. The memory map may include memory space allocated to text (e.g., machine instructions); initialized static and global data, uninitialized static data, dynamically allocated "heap" memory obtained dynamically through memory allocation requests, and/or a stack for holding values (e.g., return addresses, local variables, temporary data, and/or saved registers).

When a process is running, the system may be understood to be in a context of that process. When a kernel (e.g., a kernel associated with the process) decides to execute another process, the kernel may switch the context, causing the system to execute in a different process context. When performing a context switch, the kernel may save information needed to switch back to the earlier process and continue executing the earlier process where execution was left off.

At a point in time, a process may be in one of several states, e.g., ready, running, or blocked. A process may be blocked when it is waiting for an event to occur. In some embodiments, such as on a single processor machine, only one process may be running at a time. However, multiple processes may be ready to run, and several processes may be blocked. In some embodiments, the operating system may maintain a list of ready processes. In some embodiments, a scheduler may be responsible for prioritizing the processes in the list based on which processes are to run at a given point in time. The scheduler may save the state of a process when the execution of the process is stopped and may restore the state of the process when execution of the process resumes. In some embodiments, such as during execution, a program may need to read a file, write to a device, or run another program. These operations may use operating system intervention. The interface between the operating system and user programs may include a set of system calls (e.g., open, close, read, fork, execve, etc.).

In some embodiments, an operating system agent (OSA) may be provided to generate a random, ad-hoc, "alien" context for executions, such as executions of a received binary code (e.g., each execution of a received binary code). The random alien context may include an emulated software-based 'synthetic' CPU, an instruction set that is not native to the physical CPU, randomized memory locations, alien registers, and/or scattered memory locations for relocating machine instructions randomly across memory locations.

In some embodiments, for a received binary code for execution, a binary map may be created representing the executable binary image associated with the received code. In some embodiments, an 'alien' version of the binary image (e.g., program executable) may be generated from the received binary code (e.g., by disassembling the received binary code and recompiling the received binary code or a disassembled derivative thereof). The alien binary image may be based on the chaotic, 'alien' execution context created by the OSA for that execution.

In some embodiments, the alien binary image (e.g., alien program executable) may run using the modified (e.g., alien)

execution context. In some embodiments, machine instruction may exist at randomized memory locations, for example because the OSA interpreter (e.g., the 'synthetic' CPU) runs the chaotic version of the relevant binary code using the alien context. Therefore, exploitations and/or code injections attempting to rely on a predictable CPU instruction set or memory locations may fail, while legitimate code may execute as intended.

Reference is now made to FIG. 1, which depicts, in a static mode, components of an exemplary computer system 100 for preventing exploitations and neutralizing the execution of malicious code, constructed and operative in accordance with some embodiments.

Computer system 100 may include processor(s) 102, at least one secondary storage device 106, memory 104, and/or communication infrastructure 108, which may interconnect one or more of the above.

System 100 may store in a non-volatile memory thereof, such as memory 104 or another storage device, program instructions or components configured to operate processor(s) 102. In some embodiments, the software components may include an operating system, including various software components and/or drivers for controlling and managing general system tasks (e.g., memory management, storage device control, power management, etc.) and facilitating communication between various hardware and software components. Processor(s) 102, memory 104, and secondary storage device 106 may be connected to a communication infrastructure 108 via a suitable interface, such as one or more communication buses or one or more networks (e.g., wireless or wired networks). Memory 104 and/or secondary storage device 106 may include a random access memory (RAM), flash memory, read-only memory (ROM), one or more hard disk drives, one or more memory cards, one or more memory sticks, and/or any other non-volatile computer data storage device.

Memory 104 may store an operating system (OS) 110. OS 110 may manage one or more hardware components (e.g., processor(s) 102, memory 104, secondary storage device(s) 106, etc.) and software executing on first computing device 101. OS 110 may include one or more components that perform certain tasks relating to the execution of software on computing device 101, such as process loader 112, which may be configured to initiate the creation of a computing process, e.g., program execution process 120, such as in memory 104. Memory 104 may be divided into a user space 116, e.g., for running application software and a kernel space 114, e.g., for running system software.

Program execution process 120 may be an instance of a computer program being executed by processor(s) 102. The computer program may include an application program (referred to herein as an "application"), a system program, or another computer program executed by processor(s) 102. The computer program may be embodied as instructions and/or data included in a binary image (e.g., binary program image 118).

Binary program image 118 may be stored in secondary storage device 106. In some embodiments, such as to initiate the creation of program execution process 120, process loader 112 may load (or "map") a binary program image 118 into an address space allocated for program execution process 120 in memory 104. The mapping may be based on information included in binary program image 118. The binary image mapped into memory 104 may be represented by mapped binary image 122. In some embodiments, process loader 112 may build up an initial execution context of program execution process 120. Program execution process 120 may include one or more threads of execution for executing a subset of instructions concurrently. In some embodiments, such as during program execution, operating system 110 may allocate various resources to program execution process 120. The execution context of program execution process 120 may include information about the resource allocation, a current state of the program execution, an instruction to be executed next, and/or other information related to the program execution. The computer program execution may continue until processor(s) 102 execute a termination or halt instruction.

Binary program image 118 may be generated by performing one or more of compiling, assembling, and/or linking a computer program. Binary program image 118 may be loaded into memory (e.g., memory 104) while the operating system executes the program, such as to instruct the operating system how to process data stored in the memory. Examples of executable binary formats for binary program image 118 include, but are not limited to, portable executable (PE) format (e.g., files having an .exe, .dll, and/or a .sys extension), Executable and Linkable Format (ELF), or Mach object (Mach-O) file format.

Binary program image 118 may include one or more headers and/or other sections, which process loader 112 may use to map binary program image 118 (or portions thereof) into memory 104. The header of binary program image 118 may include information regarding a layout and properties of binary program image 118 (e.g., the names, number and/or location of section(s) within binary program image 118. The header may also include a base address, which may also be referred to as an image base, which may specify a default address for loading binary program image 118 into memory 104. For example, the address at which binary program image 118 may be loaded into memory 104 may be a randomized address, such as in embodiments where OS 110 supports ISR or Address Space Layout Randomization (ASLR).

Section(s) of binary program image 118 may include an executable code section, a data section, a resources section, an export data section, an import data section, and/or a relocation section. The executable code section may include instructions that correspond to a computer program to be executed by processor(s) 102. The instructions may be machine code instructions that are to be executed by processor(s) 102, such as after binary program image 118 is loaded into memory 104. The data section may include uninitialized data for executing the computer program, e.g., static and/or global variables. The resources section may include resource information for executing the computer program, e.g., icons, images, menus, or strings.

In some embodiments, program instructions of system 100 may include one or more software modules which may execute in memory 104, such as Operating System Agent (OSA) 126, an agent loader 130, a chaotic generator 132, a binary instrumentation and mutation (BIM) module 134, and/or a lifter module 136.

System 100 as described herein is only an exemplary embodiment, and in practice may be implemented in any combination of hardware and/or software. System 100 may have more or fewer components and modules than shown, may combine two or more of the components, may have multiples of a component, and/or may have a different configuration or arrangement of the components. System 100 may include any additional component enabling it to function as an operable computer system, such as a motherboard, a data bus, a power supply, a network interface card, etc. (not shown). Moreover, components of system 100 may be co-located or distributed, or the system may be configured to run as one or more cloud computing "instances," "containers," "virtual machines," or other types of encapsulated software applications.

Figure 2:
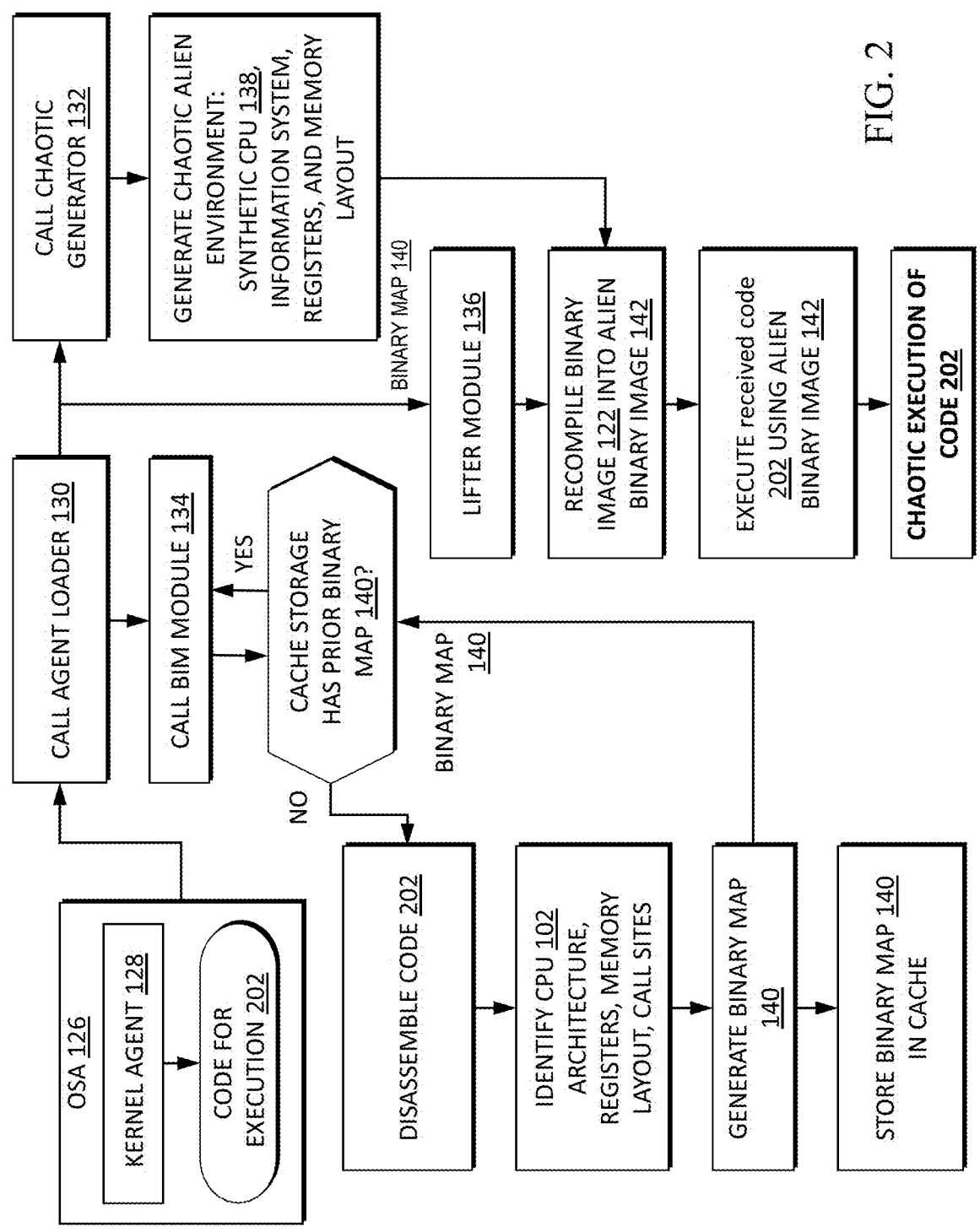
FIG. 2 illustrates a flowchart of the functional steps in an exemplary process for automated neutralizing of malicious code on a computer system, in accordance with some embodiments of the present disclosure.

Reference is now made to FIG. 2, which illustrates a flowchart of an exemplary method for automated neutralizing of malicious code on a computer system, in accordance with some disclosed embodiments. The steps of FIG. 2 are described with reference to system 100 in FIG. 1.

In some embodiments, an executable program code 202 may be received for execution by a computer system, such as system 100 of FIG. 1. In some embodiments, OS 110 of system 100 may initiate an execution process for the program, e.g., program execution process 120. Binary program image 118 may be stored in secondary storage device 106. In some embodiments, such as to initiate the creation of process 120, process loader 112 may load, or map, binary program image 118 as mapped binary image 122 into an address space allocated for process 120 in memory 104. The loading may be based on information included in mapped binary image 122. Process loader 112 may build up an initial execution context of process 120. Process 120 may include one or more threads of execution that execute a subset of instructions concurrently.

In some embodiments, OSA 126 may be loaded onto OS 110 of system 100. In some embodiments, kernel agent module 128 of OSA 126 may intercept a process creation event, e.g., process 120, initiated by operating system 110 or any component thereof. In some embodiments, in response to intercepting process 120, OSA 126 may suspend the creation of process 120, and may inject OSA 126, and/or one or more modules of OSA 126, into process 120, e.g., via an agent loader 130, chaotic generator 132, BIM module 134, and/or lifter module 136.

In some embodiments, BIM module 134 may generate a binary map 140, which may represent a structure of binary program image 118. In some embodiments, binary image 118 may correspond to mapped binary image 122.

In some embodiments, BIM module 134 may attempt to locate a previously-generated binary map 140, which may be associated with a previous execution of received executable program code for execution 202. In some embodiments, such as if no previously-generated binary map 140 exists in the cache, BIM module 134 may generate a new binary map 140 and/or may store new binary map 140 in the cache as a binary map associated with the mapped binary image 122. In some embodiments, BIM Module 134 may disassemble mapped binary image 122, extract data relevant for binary map construction (e.g., data, instructions, registers, locations), and construct binary map 140. The relevant data may include any information that may facilitate proper execution of mapped binary image 122 (e.g., via CPU 102). For example, the relevant data may include one or more of computing instructions (e.g., logical and/or arithmetic operators), data (e.g., values for arguments, parameters, or functions), and memory locations (e.g., address offsets to facilitate locating the data to be used with the operators within a known memory segment) that may be referred to in the disassembled version of mapped binary image 122.

Figure 3A:
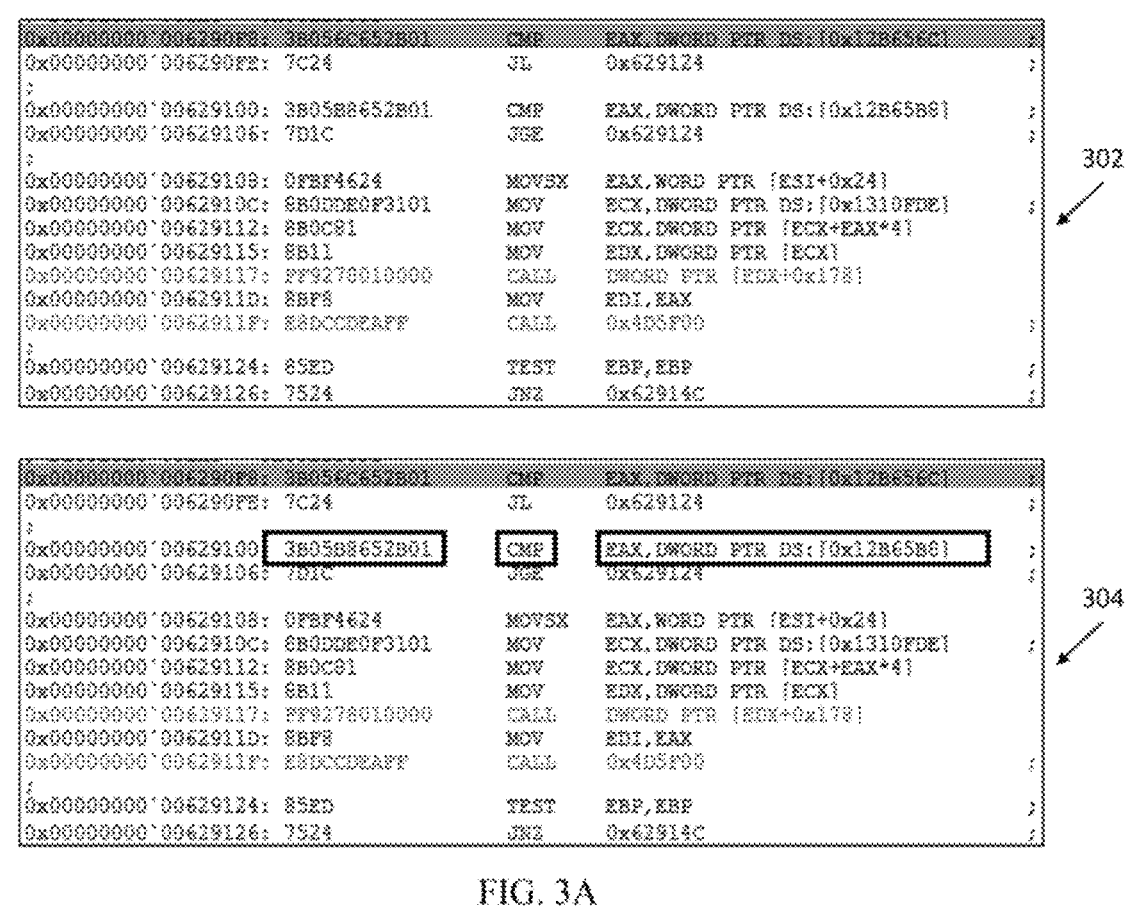

Reference is made to FIG. 3A, which depicts an exemplary binary image in panel 302, consistent with disclosed embodiments. Panel 302 may include one or more references to memory locations, memory values, and/or operations. The left-hand side of panel 302 may include the references in a low-level code, such as binary machine code. The right-hand side of panel 302 may include corresponding references in a higher-level human readable code, such as assembler code. In some embodiments, the assembler code portion of panel 302 (e.g., the right-hand side) may be a product of disassembling the machine code portion of panel 302 (e.g., the left-hand side). A panel 304 in FIG. 3A schematically depicts (through the bolded boxes) examples of possible relevant data for extraction from the binary image.

FIG. 3B schematically depicts an exemplary implementation of a relationship between a CPU instruction stream (e.g., on the left-hand side of FIG. 3B) and a corresponding binary map, (e.g., on the right-hand side of FIG. 3B). The CPU instruction stream on the left-hand side of FIG. 3B may be in a human-readable form such as in assembler language and may be a product of disassembling binary machine code, such by disassembling mapped binary image 122. The corresponding binary map on the right-hand side may be a binary map generated consistent with disclosed embodiments, such as binary map 140 generated by extracting relevant data from the disassembled version of mapped binary image 122. The binary map (e.g., on the right) may organize data extracted from the CPU instruction stream (e.g., on the left) into categories, such as opcodes (e.g., operators), operands (e.g., data), and location offset (e.g., indicating the location of the data within a given segment of memory).

In some embodiments, BIM module 134 may return binary map 140 to agent loader 130. For example, BIM module 134 may retrieve binary map 140 from storage in cache for a previous execution of the received code for execution or may generate binary map 140 in the present execution instance.

In some embodiments, agent loader 130 may be configured to call chaotic generator 132 to generate an ad-hoc alien execution context for the present instance of the execution of received executable program code for execution 202. In some embodiments, chaotic generator 132 may be configured to generate a random 'alien' execution context for an execution of received executable program code 202 (e.g., within process 120). In some embodiments, the alien execution context may include an emulated software-based 'synthetic' CPU 138, which may include an instruction set that is not native to the CPU and/or registers. Additionally or alternatively, the alien execution context may further comprise randomized memory locations.

In some embodiments, an alien execution context may include at least one of:

An emulated, software-based CPU including at least a randomized instruction set and registers;

randomize memory locations;

random padding of random segments in the code; and/or randomized properties of specified application programming interfaces (APIs) (e.g., operating system version, hardware metadata, hardware events, etc.).

As noted, to infect a computer, malicious code may require knowledge of the instruction set running on the computer. Sometimes, an instruction set is well known. However, in some embodiments, the chaotic 'alien' execution context instanced for the current execution by chaotic generator 132 may include an instruction set that is not native to the hardware CPU, and therefore may be unknown to an attacker. In some embodiments, for a type of instance that generates the randomized chaotic instruction set (e.g., each type of instance that generates the randomized chaotic instruction set), OSA 126 may map the randomized instructions to the native instructions of CPU 102.

Following are some examples of randomized instruction codes using the Intel instruction set. In some embodiments, such as those involving Intel assembly language, the following byte sequences may translate as follows:

B8 11 22 33 44: MOV eax., 0x44332211

25 FF 45 67 89: AND eax. 0x896745FF

These are two different byte codes representing two different operations (B8 vs. 25). In a randomized CPU instruction set, the following may now occur:

NOT SSE, 0x44332211

As a result of the translation, B8 may now be NOT EAX, for example. Random and/or unique byte codes may be chosen to represent instructions. The random and/or unique byte codes may be unknown outside the execution context, making it more difficult for malicious code to infiltrate an operating system or process.

In some embodiments, agent loader 130 may forward binary map 140 (received from BIM module 134) to lifter module 136. Lifter module 136 may recompile binary image 122 into an alien binary image 142 (e.g., alien program executable), such as by using binary map 140 and/or the alien execution context generated by chaotic generator 132. Alien binary image 142 may be compatible with the alien execution context generated by chaotic generator 132. Thus, alien binary image 142 may represent the structure of original binary image 122, with data, instructions, registers, locations, and the like, replaced with corresponding (e.g., alien) data, instructions, registers, and locations associated with the alien execution context.

In some embodiments, agent loader 130 may load alien binary image 142 into memory 104, to be executed over computer system 100. Synthetic CPU 138 may act as an interpreter with respect to the execution of alien binary image 142 by host CPU 102.

In some embodiments, OSA 126 may be configured to determine whether any library modules (e.g., DLLs) have already been loaded into the address space of process 120. OSA 126 may copy the loaded library module(s) into a random memory range. The library module(s) loaded into the original address space may be modified into a stub (e.g., shadow) library, which may include stub procedures and functions. In some embodiments, such as when an executing code attempts to retrieve a library module handle of a library module including a requested procedure and/or the address of the procedure in one of the library module(s), the executing code may receive the library module handle of the shadow (e.g., stub) library. Consequently, legitimate code may run as intended. However, when a malicious code attempts to retrieve the library module handle, the malicious code may receive a library module handle of the stub library instead. The malicious code may not be able perform its intended malicious activities. In addition, OSA 126 may be able to detect an attempt by a malicious code to access the non-accessible memory regions, and may halt execution.

Reference is now made to FIG. 4, which is a flowchart of a method for automated neutralizing of malicious code on a computer system, consistent with disclosed embodiments. The steps of the flowchart in FIG. 4 are described with reference to system 100 in FIG. 1.

In some embodiments, for example at step 402, a binary code may be received for execution by a computing system, such as system 100 in FIG. 1. For example, a user of system 100 may receive an email message containing a Word document, which may contain a zero-day attack exploiting a memory vulnerability in Microsoft Office Word.

In some embodiments, the user, unaware of the malicious code embedded in the received document, may open the Word document, thereby initiating execution of the malicious code.

In some embodiments, for example at step 404, kernel agent module 128 of OSA 126 (or other computing element) may intercept a process creation event initiated by operating system 110, associated with the malicious code. In some embodiments, such as in response to intercepting such a process, OSA 126 may suspend the creation of the process. OSA 126 may inject one or more modules into process 120, such as agent loader 130, chaotic generator 132, BIM module 134, and/or lifter module 136 (as detailed in FIG. 1).

In some embodiments, for example at step 406, BIM module 134 may attempt to locate a previously-generated binary map 140, which may be associated with a previous execution of received code. In some embodiments, such as if no previously-generated binary map 140 exists in the cache, BIM module 134 may generate a new binary map 140. BIM module 134 may store new binary map 140 in the cache as a binary map associated with the mapped binary image 122, such as for re-use during a future computing process associated with binary image 122.

In some embodiments, BIM Module 134 may disassemble mapped binary image 122, extract relevant data for binary map construction (e.g., data, instructions, registers, locations), and construct binary map 140. In some embodiments, BIM module 134 may return a mapped binary image to agent loader 130. Agent loader 130 may forward the generated mapped binary image to lifter module 136.

In some embodiments, for example at step 408, loader 130 may call chaotic generator 132 to generate an ad-hoc alien execution context for the present instance of the execution of received code. In some embodiments, chaotic generator 132 may generate a random 'alien' execution context to execute received executable program code 202 (e.g., within process 120). In some embodiments, the alien execution context may include an emulated software-based 'synthetic' CPU 138, which may include an instruction set that is not native to the CPU and/or registers. Additionally or alternatively, the alien execution context may further include randomized memory locations.

In some embodiments, for example at step 410, lifter module 136 may recompile binary image 122 into an alien binary image 142 (e.g., alien program executable), such as by using binary map 140 and/or the alien execution context generated by chaotic generator 132. Alien binary image 142 may be compatible with the alien execution context generated by chaotic generator 132. Thus, alien binary image 142 may represent the structure of original binary image 122, where data, instructions, registers, locations, and the like, may be replaced with corresponding (e.g., alien) data, instructions, registers, and locations associated with the alien execution context.

In some embodiments, for example at step 412, the received code may be executed using the alien binary image 142. For example, a Word file may contain malicious executable instructions configured to inject a shellcode by relying on certain assumptions regarding the runtime execution context of the target computing device. However, the malicious code may fail because of incompatibility between the shellcode instructions with the alien execution context. In some embodiments, the incompatibility may trigger an error, e.g., a parsing error, indicating the detection of malicious code or malware.

For example, malicious code using techniques such as return oriented programming (ROP), just-in-time return oriented programming (JIT-ROP), and/or jump oriented programming (JOP), may fail. This may be because no other execution parameters can be predicted due to the chaotic execution context created for this instance of execution. This may be the case even if the malicious code successfully accesses memory content or addresses.

Some embodiments may provide a system comprising: at least one hardware processor; and a non-transitory computer-readable storage medium having stored thereon program instructions, the program instructions executable by the at least one hardware processor to: determine that an operating system has initiated a computing process, and inject, into the computing process, a code configured to: create a map representing the structure of a binary image associated with the computing process, generate a chaotic execution context for the computing process, wherein the chaotic execution context comprises at least one of: (i) an emulated central processing unit (CPU), (ii) an instruction set associated with the emulated CPU that is not native to the at least one hardware processor, (iii) randomization of the registers, or (iv) randomized memory locations, recompile the binary image into an execution binary image compatible with the chaotic execution context, and execute the computing process using the execution binary image and the map.

In some embodiments, the computing process may be an execution of a computer program code.

In some embodiments, the determining that an operating system has initiated a computing process may include intercepting a process creation event initiated by the operating system.

In some embodiments, creating the map may include disassembling the binary image to extract data contained in the binary image.

In some embodiments, the created map may be stored on the storage medium, for re-use during a future computing process associated with the binary image.

In some embodiments, the randomized memory locations may include regions of memory that are allocated to the computing process.

In some embodiments, the regions of memory may include memory allocated to at least one of: machine instructions, initialized static and global data, uninitialized static data; heap, or stack.

Disclosed embodiments may involve cybersecurity operations. A cybersecurity operation may include one or more actions designed to impede, thwart, or at least partially avoid unauthorized activities in a computer system or network. Unauthorized activities may involve attempts to exploit a computer system or network, to gain unauthorized access, and/or to conduct malicious activities. Cybersecurity operations described herein may impede, thwart or at least partially avoid unauthorized activities through the practice of methods, or operations implemented through at least one processor and/or through a computer readable medium, which may include software code. Such operations may be carried out in a computer system and/or via a network. In some embodiments, an operating system agent (e.g., an "OSA") may be provided to perform cybersecurity operations.

Figure 6:
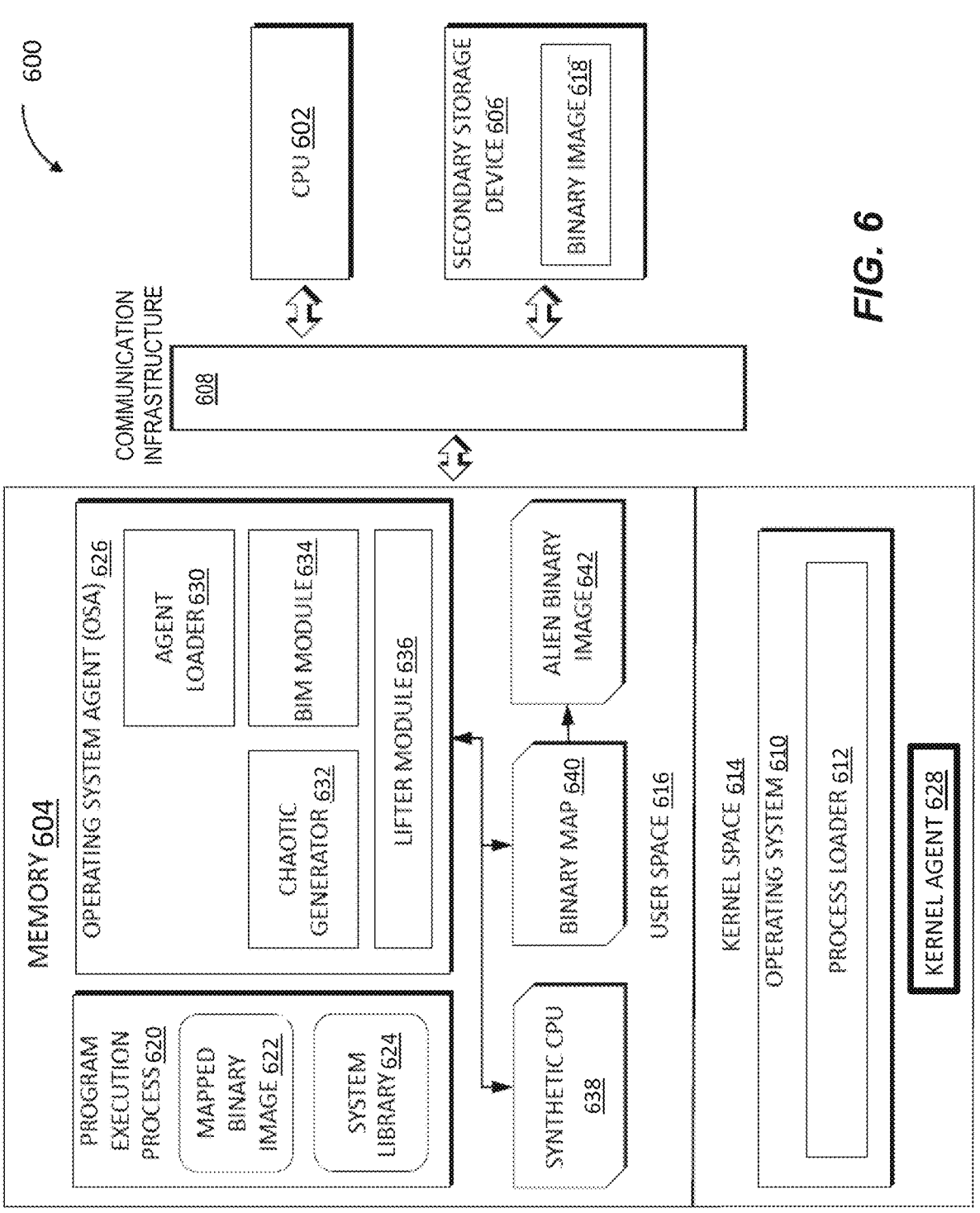
FIG. 6 depicts in active mode, components of an exemplary computer system for preventing exploitations and neutralizing the execution of malicious code associated with a computing process executing thereon, in accordance with some embodiments of the present disclosure.

Reference is now made to FIG. 6 which illustrates a computer system 600 for performing cybersecurity operations, consistent with disclosed embodiments. FIG. 6 shares some similarity with FIG. 1 with a noted difference of a kernel agent 628 of OSA 626 now located in a kernel space 614 of a memory 604 of computer system 600. FIG. 6 represents an active mode of the system. Computer system 600 may include at least one processor 602, at least one secondary storage device 606, and memory 604. At least one processor 602, at least one secondary storage device 606, and memory 604 may be in electrical communication via a communication infrastructure 608. Communication infrastructure 608 may include any suitable wired and/or wireless communications means to enable electrical communication between at least one processor 602, secondary storage device 606 and memory 604. At least one secondary storage device 606 device and memory 604 may include one or more hard disks or CD ROM, or other forms of RAM or ROM, Universal Serial Bus (USB) media, DVD, Blu-ray, 4K Ultra HD Blu-ray, or other optical drive media volatile or non-volatile, magnetic, semiconductor, tape, optical, removable, non-removable, or other type of storage device or tangible or non-transitory computer-readable medium. Secondary storage device 606 may store a binary image 618, which may correspond to binary image 118 of FIG. 1 (e.g., may share one or more characteristics of binary image 118).

Memory 604 may be divided into a user space 616, e.g., for running application software and a kernel space 614, e.g., for running system software. User space 616 may grant limited access to system resources, such as via one or more tightly controlled application programming interfaces (APIs) (e.g., an API with a restricted set of performable operations). Kernel space 614 may grant full access to system resources and may be accessible to system software, such as an operating system 610 configured with computing system 600. The division between user space 616 and kernel space 614 may protect system resources (e.g., critical system resources) from errant or malicious application software. User space 616 may store an OSA 626, which may correspond to OSA 126 of FIG. 1 (e.g., may share one or more characteristics of OSA 126). OSA 626 may include a combination of an agent loader 630, chaotic generator 632, and BIM module 634, any or all of which may be located in user space 616, and which may correspond, respectively, to agent loader 130, chaotic generator 632, and BIM module 134 of FIG. 1 (e.g., may share one or more characteristics of agent loader 130, chaotic generator 632, and BIM module 134). OSA 626 may additionally include a kernel agent 628, which may correspond to kernel agent module 128 of FIG. 1 (e.g., may share one or more characteristics of kernel agent module 128), though kernel agent 628 is shown in an active mode (e.g., by being located within kernel space 614). Exemplary kernel agent module 128 of FIG. 1 is shown in a static mode (e.g., by being located within user space 116). For example, kernel agent 628 may be injected into kernel space 614, e.g., via code associated with OSA 626. Computing system 600 may additionally include a program execution process 620, a mapped binary image 622, a system library 624, a synthetic CPU 638, a binary map 640, an alien binary image 642, and a process loader 612, which may correspond, respectively, to program execution process 120, mapped binary image 122, system library 124, synthetic CPU 138, binary map 140, alien binary image 142, and process loader 112 of FIG. 1 (e.g., may share one or more characteristics of the respective component).

Disclosed embodiments may involve at least one processor for performing the cybersecurity operations, such as at least one processor 602 of FIG. 6. The at least one processor may be configured to execute computer programs, applications, methods, processes, or other software to execute particular instructions associated with embodiments described in the present disclosure. The term "processor" refers to any physical device having an electric circuit that performs a logic operation. For example, at least one processor 602 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. At least one processor 602 may include at least one processor configured to perform functions of the disclosed methods such as a microprocessor manufactured by Intel™, Nvidia™, AMD™, and so forth. At least one processor 602 may include a single core or multiple core processors executing parallel processes simultaneously. In one example, at least one processor 602 may be a single core processor configured with virtual processing technologies. At least one processor 602 may implement virtual machine technologies or other technologies to provide the ability to execute, control, run, manipulate, store, etc., multiple software processes, applications, or programs (e.g., by spinning up and/or spinning down virtual computing instances). In another example, at least one processor 602 may include a multiple-core processor arrangement (e.g., dual, quad core, etc.), which may be configured to provide parallel processing functionalities to allow a device associated with at least one processor 602 to execute multiple processes simultaneously. It is appreciated that other types of processor arrangements could be implemented to provide the capabilities disclosed herein.

Consistent with the present disclosure, the methods and processes disclosed herein may be performed by a server as a result of at least one processor 602 executing one or more sequences of one or more instructions contained in a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within the server, or at a remote location. Additionally, one or more computer-readable storage mediums may be utilized in implementing a computer-implemented method. The term "computer-readable storage medium" should be understood to include tangible items and exclude carrier waves and transient signals.

Disclosed embodiments may further involve determining that an operating system has initiated a computing process. An "operating system" (i.e., "OS") may include system software running on a computer that provides a platform for running other computer software programs (e.g., on the computer). Examples of OSs may include Microsoft Windows®, Apple macOS®, Linux®, Android® and Apple's iOS®. An OS may provide a platform for running additional computer software programs, such as application software for text editing, image editing, mathematical calculations, database management, or other software packages configured to operate on the computer. A "computing process" may include at least one of an instance of a computer software program (e.g., application software) executable on the computer, such as via the platform provided by the OS, a function, an instruction set, or any other code configured for execution.

Determining that an operating system has initiated a computing process may include at least one of monitoring process execution (e.g., a sequence of instructions), launching a listener, parsing operations (e.g., a memory read operation, a memory write operation), scanning a file, detecting when the OS has loaded an executable file for the computing process into memory (e.g., by monitoring memory instructions), or performing any operation to extract information from a computing process. For example, a software component may be configured with a computer to determine when an OS has initiated the computing process. In some embodiments, an OSA may include a kernel driver, or agent, configured with a kernel of the OS. The kernel driver of the OSA may determine when the OS is preparing to execute a computing process. For example, the kernel driver of the OSA may detect when Windows has loaded an executable file for Word into memory (e.g., in preparation for initiating an instance of Word). FIG. 6 illustrates one example of kernel agent 628 of OSA 626 determining that OS 610 has initiated program execution process 620 (e.g., a computing process) by detecting that OS 610 has loaded binary program image 618 from storage at secondary storage device 606 as mapped binary image 622 in memory 604 (e.g., an executable file).

In some embodiments, an OS may schedule execution of a computing process concurrently with the execution of other computing process or "instances," e.g., as multiple execution threads for the same application software or for a different application software. For example, when a user opens Microsoft Word® (i.e., "Word") to edit a document on a computer running Microsoft Windows® (i.e., "Windows"), Windows may initiate a computing process for Word within which the user may edit the document. If the user opens Microsoft Excel® (i.e., "Excel") to edit a different document (e.g., concurrently), Windows may initiate another computing process for Excel within which the user may edit the second document.

An OS typically includes a kernel for interfacing between the hardware and software components of a computer system. A kernel may control access to resources (e.g., critical resources), such as the CPU, cache memory, input/output (I/O) devices, and/or other resources for executing software. In some embodiments, a kernel (e.g., the kernel of the OS) may run in a privileged processor mode (e.g., a kernel mode or kernel space), which may grant full access to system resources. By contrast, application software may run in a nonprivileged mode (e.g., a user mode or user space) granting only limited access to system resources, such as via one or more tightly controlled application programming interfaces (APIs) (e.g., an API with a restricted set of performable operations). Division between a kernel mode and a user mode may protect system resources (e.g., critical system resources) from errant or malicious application software. As part of initiating a computing process, an OS may load an executable file for the computing process into memory (e.g., RAM) in preparation for execution by a processor. The executable file may contain machine code instructions that are readable by the processor.

Returning to the Word example, to initiate a new computing process for Word, Windows may load (e.g., into RAM) executable code for executing Word. To execute the computing process, the OS may allocate resources, such as processor (e.g., CPU) time, memory, task scheduling, and/or other computing resources needed for proper execution.

Disclosed embodiments may further involve replacing the computing process with a code. Replacing the computing process may include removing associated code from the computing process, adding code to the computing process, rearranging code within the computing process, modifying code within the computing process, or any other operation to substitute or supplant at least a portion of code within the computing process with at least one different executable computer program instruction. The term "code" may refer to one or more software instructions, operations, functions, objects, methods, and/or arguments, any of which may be associated with a software agent, such as an OSA. For example, upon detecting that the OS has initiated a computing process (e.g., by determining that the OS loaded an executable file for the computing process into memory), the kernel driver of the OSA (or other driver, code, or computing element) may intervene with or intercept the regular execution of the computing process and replace an executable file associated with the computing process (e.g., code implementing the computing process, code that is part of the computing process) with code associated with the OSA (e.g., code implementing the OSA or one or more functions associated therewith, code that is part of the OSA, code generated by the OSA), e.g., by removing the executable file from RAM and loading the code associated with the OSA into RAM instead.

Returning to the Word example, upon determining that Windows (e.g., the OS) has initiated a computing process for Word (e.g., the computing process), the kernel driver of the OSA (or other driver, code, or computing element) may replace the executable version of Word (e.g., previously loaded into RAM) with code associated with the OSA. FIG. 6 illustrates an example of system 600 for replacing program execution process 620 (e.g., a computing process) in memory 604 with code associated with OSA 626. For example, kernel agent 628 of OSA 626 may intercept program execution process 620 from being executed by at least one processor 602, and agent loader 630 of OSA 626 may replace mapped binary image 622 with code associated with OSA 626 (e.g., following interception of program execution process 620). The code (e.g., associated with OSA 626) replacing mapped binary image 622 may include one or more of chaotic generator 632, BIM module 634, and lifter module 636 of OSA 626.

In some embodiments, the code (e.g., code associated with an OSA and replacing a computing process) may be configured to create a map representing a structure of an original binary image, which may be associated with the replaced computing process. A "map" may refer to a table; a chart; a graph; a diagram; an outline; a layout, a data structure; an organization, association or contextualization of data relevant to executing a computer program; or any representation describing a computing process, such as a static version of the computing process. The term "structure" may refer to the static version of the computing process, such as described above. The term "binary image" may refer to an executable file, e.g., containing instructions in machine code (e.g., binary) that may be executable by a specific processor, e.g., written in a compatible ISA. The term "original binary image" may refer to the binary image for the computing process that was replaced, or any version of a binary image prior to a change. A binary image may be created after compiling, assembling and/or linking higher-level source code into executable code and may include instructions of the ISA that are specific to the processor on which the instructions are to be executed. The processor may be a physical hardware processor, such as a CPU, graphic processing unit (GPU), arithmetic processing unit (ALU), an emulated (e.g., software) processor, or any other processor or processor-like equivalent capable of executing machine code. The code (e.g., for the OSA that replaced the original binary image) may, when executed, obtain a map representing a structure of the original binary image. A structure of an original binary image associated with the replaced computing process may include an operation, a memory location, a memory value, a timing, a sequence, and/or a relationship thereof, any of which may be associated with the replaced computing process, described above. For example, a map may define which operations are to be executed for the computing process and in what sequence, which arguments to apply to the operations, and/or which memory locations are (or will be) referenced.

As one non-limiting example, a map may be organized as a table with multiple columns, such as three columns: opcode, operand, and offset, as illustrated on the right-hand side of FIG. 3B. The table may organize information stored therein according to context and association with other information stored in the table. The opcode column may record a binary code identifying an instruction or operation to be executed by a CPU, such as to add, move, or shift data. The operand column may identify a data item (e.g., file, memory value) and/or memory location used to (or usable to) execute the instruction. The location offset column may identify a memory location for executing the instruction, such as by indicating the distance of a referenced memory location from the start of a memory segment. While the map of FIG. 3B is shown in table form, this implementation is intended as illustrative only, and the map may alternatively be implemented as a tree, web, graph, chart, or any other format suitable for illustrating a static version of a computing process.

In some embodiments, a map may be previously defined and an OSA may retrieve the map from memory, such as a cache memory. Returning to the Word example, Windows (i.e., the OS) may determine that Word (e.g., a computing process) is used frequently (e.g., exceeding a predefined usage frequency threshold) such that it may be efficient to store a map of Word in cache memory for subsequent runtime instances of Word. The code associated with the OSA (e.g., which replaced the executable version of Word) may obtain the map representing the structure of the executable version of Word from memory. FIG. 6 shows an example of BIM module 634 of OSA 626 configured to obtain binary map 640, such as by retrieving from a cache memory (not shown) a map for program execution process 620 that may have been previously created, e.g., by OS 610.

Additionally or alternatively, the OSA may create the map. As one non-limiting example, the code associated with the OSA (e.g., that replaced the original binary image for the computing process) may disassemble the original binary image, such as into assembler language instructions. The term "disassemble" may refer to converting or translating a program in its executable form (e.g., binary machine code) to an alternative format, such as an assembly language representation that may be readable by a human. After disassembling the original binary image, the code associated with the OSA may create the map from the assembly language instructions, and/or from the original binary image. The map may depict (e.g., statically) how the execution of the original binary image might progress if it would be executed by the processor. Alternatively, the OSA may obtain the map or portions thereof by other means, such as via a direct analysis of the original binary image, an analysis or trace of an execution of the original binary image, an analysis or trace of an execution log report of the original binary image, as well as, in some embodiments, an application of one or more heuristics, learning, artificial intelligence and/or interpretive techniques to determine one or more of an association, context, classification, or organization of information relevant to executing the computing process.

Returning to the Word example, the OSA may disassemble the executable binary image for Word (e.g., that was replaced by the code associated with the OSA) into a sequence of assembler language instructions that may represent an executable version of Word in human readable assembler code. The OSA may then create a map representing the structure of the original binary image for Word, from either one or both of the assembler language instructions and the original binary image for Word.

FIG. 6 illustrates an example of BIM module 634 of OSA 626 configured to disassemble mapped binary image 622 and create binary map 640 from the resulting assembler language representation. Alternatively, BIM module 634 may create binary map 640 directly from mapped binary image 622. Binary map 640 may represent a structure, e.g., a static version of an execution flow, for mapped binary image 622. As another example, turning to FIG. 3B, the left-hand side illustrates a disassembled binary image as a sequence of assembler language instructions generated, for example, by BIM module 634 of OSA 626. The right-hand side of FIG. 3B shows an example of a table (e.g., map) classifying different portions of the disassembled binary image, such as may be created or otherwise obtained by BIM module 634. The assembly language instructions may be organized into opcodes, operands and/or location offsets that together, chronicle the execution flow for the computing process replaced by the code for OSA 626.

Some embodiments may further involve generating a modified execution context for the computing process. An "execution context" may refer to a process, a program, an application, a frame, a file, a function, a container, a module, a call (e.g., an API call), one or more lines of code, a parameter, an argument, or any computerized information defining or influencing the computing environment in which a process runs. In some embodiments, an execution context may store information about the environment of code currently being executed (or code to be executed), such as a scope defining which variables, objects, parameters, and/or functions are accessible, regions of memory that have been allocated, values (e.g., for addresses, pointers, program counters, or registers), any other computerized parameter that may influence code execution, or any combination thereof. A "native execution context" may refer to an execution context that is an intrinsic, inherent, predictable, or standard runtime behavior for a computing process. A modified execution context may include an execution context (e.g., a native execution context) that has been altered, changed, or otherwise transformed to a different, e.g., alien, execution context. Generating a modified execution context may include constructing, adding, removing, rearranging, replacing, and/or moving a function, an argument, a variable, a call, an object, an operation, a memory value, a memory location, or any aspect of an execution context, discussed above. For example, the code (e.g., associated with the OSA) may include a chaotic engine and/or generator, which may be configured to modify the native execution context defined for the original binary image (e.g., that was replaced by the code associated with the OSA), such as by introducing one or more random or chaotic aspects to one or more parameters affecting the runtime environment. In some embodiments, the OSA may modify a native execution context in real time, e.g., within scheduling constraints of an execution flow in process. Alternatively, in some embodiments, the OSA may store one or more predefined modifications for an execution context in advance and use the one or more predefined modifications for the modified execution context, to thereby generate the modified execution context. In some embodiments, modifying the execution context may entail modifying multiple different runtime parameters. In some embodiments, multiple modifications may be made to different runtime parameters that are unrelated (e.g., independent) of each other. In some embodiments, one or more modifications may be made to coupled runtime parameter such that a modification to one runtime parameter affects one or more additional runtime parameters (e.g., in situations where runtime parameters are uni-directionally or bi-directionally dependent with each other). In some embodiments, modifying the execution context may have a cascading effect on the runtime environment whereby a small modification to one parameter may result in significant modifications to multiple other parameters. In some embodiments, modifying the execution context may result in a chaotic runtime environment, where "chaotic" may relate to a characteristic that is disordered, unstructured, or otherwise difficult to predict.

In some embodiments, the modified execution context may exhibit non-predictability. Such non-predictability may result, for example, from one or more modifications. For example, the OSA may modify an execution context (e.g., an execution context associated with a computing process) to cause one or more unexpected chaotic unpredictable (e.g., non-native) aspects of the runtime behavior. In some embodiments, the OSA may introduce randomness to the modification of the execution context. For example, the OSA may apply one or more cryptographic techniques to generate a random number and use the random number to modify the execution context.

In some embodiments, the modified execution context may include randomized registers. The term "randomized" may relate to a characteristic that is arbitrary, indiscriminate, or unpredictable (e.g., non-deterministic). The term "registers" may refer to one or more accessible memory locations available to a processor. A randomized register may include at least one register that exhibits at least one random attribute, such as an attribute of allocation, size, number, location, type, or other attribute characterizing the register. Register allocation may be performed by a compiler when generating executable code from higher-level source code. Register allocation typically follows predictable patterns and rules, allowing an attacker to identify vulnerabilities. In some embodiments, code (e.g., associated with the OSA) may allocate at least one register in a randomized manner, such as by applying a random number as described above to the register allocation to thwart the attacker. For example, conventional compiling may typically allocate the registers L1, L2, and L3 to compute an arithmetic operation. To hinder an attack aimed at exploiting vulnerabilities associated with conventional or predictable register allocation, the code associated with the OSA may allocate registers in a randomized manner, such as by allocating the registers M5, L3, and M7 for the arithmetic operation instead.

In some embodiments, the modified execution context may include randomized memory locations. "Memory locations" may refer to any areas of memory related to at least one computing process. The memory locations may be associated with cache memory, static and/or dynamic RAM, hard disk memory (e.g., local and/or remote), an offline storage such as a compact disk (CD), a disk on key, a tape drive, or any other medium for storing information related to a computing process. Under conventional rules, memory may be allocated for the computing process in a predictable manner, allowing an attacker to identify vulnerabilities to exploit. For example, under conventional or normal operation, an OS may typically load an executable file for a computing process into a predictable address space in RAM. An attacker may exploit the predictable memory allocation to launch an attack by storing malicious code at the predictable address space, in place of the executable file. To hinder such an attack, the code associated with the OSA may allocate memory in a randomized manner, such as by applying a random number as described above to the memory allocation. For example, the code associated with the OSA may load an executable file for the computing process into unpredictable areas of RAM (or other type of memory) instead of the predictable address space typically used when initiating an execution for a computing process. In some embodiments, the modified execution context may include stubs (e.g., functions, or spies, with pre-programmed behavior) to library calls to ensure compatibility.

In some embodiments, the modified execution context may include an emulated central processing unit (CPU). An emulated CPU may include a program, application, module, or any set of computer code configured to implement at least one instruction, process, service, function, execution, or any functionality through virtualization (e.g., by interpreting original CPU instructions). An emulated processor may be a virtual (e.g., software implemented) processor that allows executing software compiled for one system (e.g., hardware processor and/or OS) on a different system (e.g., configured with a different hardware processor and/or OS). An emulated processor may dynamically translate instructions for a computer program from one ISA to another ISA that is compatible with the hardware processor and OS where the computer program is running. For example, the OSA may modify the execution context by substituting the original hardware CPU configured with a computer to execute the computing process (e.g., the native CPU) with an emulated (e.g., synthetic, software-represented) CPU. In some embodiments, the modified execution context may include an instruction set associated with the emulated CPU. An instruction set associated with the emulated CPU may include at least one instruction, command, process, service, function, call, method, operation, opcode, operand, reference (e.g., to a register or memory), or any computer code interpretable by the emulated CPU. For example, the emulated CPU may be compatible to execute code written in a different instruction set, such as an alien ISA, that is different than the ISA (e.g., the native ISA) associated with the native hardware CPU. In some embodiments, the instruction set associated with the emulated CPU may be non-native to a hardware processor on which the computing process is run (or is configured to run). Being non-native to a hardware processor may include having at least one instruction, process, service, function, call, method, operation, or portion of computer code that is uninterpretable, nonexecutable, or otherwise incompatible with the hardware processor and/or an OS configured with the hardware processor. For example, the alien ISA associated with the alien CPU may be incompatible or unfamiliar with, and thus not readable by, the native hardware CPU.

In some embodiments, the alien instruction set may be generated by randomly shuffling or mixing instructions with a known instruction set, such as the native ISA. For example, the MOV assembler instruction may be mapped as ADD, and ADD may be mapped as SUB. In some embodiments, the alien instruction set may be generated by encoding, scrambling, or encrypting the native ISA associated with the native hardware CPU. For example, MOV and ADD may be encoded as random codes F76 and 3Y8, respectively, such as by using cryptographic techniques. In some embodiments, the modified execution context may be associated with a scheduling and/or timing protocol that is non-conventional or unfamiliar (e.g., alien) to the native hardware CPU, but is compatible with the emulated CPU.

In accordance with some embodiments, additional modifications may be made to the execution context to generate a chaotic execution environment. Additionally or alternatively, executable code (e.g., input code) for executing a computing process may be converted to a chaotic version to match the chaotic execution environment. In some embodiments, modifications to the execution context may be made for multiple invocations of a computing process (e.g., each invocation of a computing process). In some embodiments, the modifications to the execution context may be made at random time intervals, according to a schedule, in response to receiving an alert or warning, or according to any other criterion that may facilitate thwarting a cybersecurity attack.

Returning to the Word example, after obtaining the map for the runtime instance of Word (e.g., the computing process), the OSA may generate a modified execution context for the runtime instance of Word, such as by invoking an emulated CPU to execute Word using an alien ISA that reads and/or writes from randomized registers and memory.

FIG. 6 illustrates an example for generating a modified execution context via agent loader 630 of OSA 626. Agent loader 630 may call chaotic generator 632 of OSA 626 to modify the execution for program execution process 620 (e.g., the computing process) such as by applying one or more of the modifying techniques described herein. For example, agent loader 630 may cause chaotic generator 632 to invoke synthetic CPU 638 to execute the computing process.

Some embodiments may involve recompiling the original binary image into an execution binary image. Recompiling may include translating and/or interpreting code (e.g., between an assembler version and a compiled version, between assembler versions, between compiled versions), reformatting code, adding code, removing code, moving code, and/or performing any operation that transforms or converts one computer code into another computer code. Thus, embodiments may be articulated as transforming the original binary image into an execution binary image. For example, a first compilation may be a conventional compilation that converts human-readable (e.g., high-level) source code instructions into binary machine code. The binary machine code (or other code derived thereof) may be subsequently recompiled (e.g., converted once again) to a different binary machine code. As another example, the code of the OSA may disassemble the original binary image (e.g., resulting from an original compilation) into slightly higher-level assembler language code. The code of the OSA may then recompile (e.g., reconvert) the assembler language code to a different machine code (e.g., an execution binary image) that differs from the original binary image. In some embodiments, the execution binary image may represent at least one functionality that corresponds to the functionality of the original binary image, however the execution of the execution binary image may be implemented differently than the execution for the original binary image, e.g., via different registers, memory locations, task scheduling and/or other runtime parameters.

Returning to the Word example, after the code associated with the OSA replaces the original binary image associated with Word in RAM (or other memory) and generates a modified execution process, the code associated with the OSA may recompile the original binary image associated with Word into an execution binary image. In some embodiments, the execution binary image may differ from the original binary image according to any number of criteria, such as the ISA, allocation of system resources such as memory and processor time, scheduling, timing, synchronization, and any other parameter that affects the runtime environment when executing Word. In some embodiments, even though executing Word via the execution (e.g., alien) binary image may be implemented differently than executing Word via the original (e.g., native) binary image associated with Word, the functionality realized by executing Word via the execution (e.g., alien) binary image may be similar (e.g., substantially similar) to the functionality realized by executing Word via the original (e.g., native) binary image. Thus, a user editing a document in Word via the execution (e.g., alien) binary image and modified execution context may have a similar (e.g., substantially similar) experience to a user editing a document via the original (e.g., native binary image) within the unmodified (e.g., native) execution context. Accordingly, in some embodiments, the user may be unaware that the execution context has been modified.

FIG. 6 illustrates an example of BIM module 634 of OSA 626 configured to recompile mapped binary image 622 (e.g., original binary image) to alien binary image 642 (e.g., execution binary image). BIM module 634 may disassemble mapped binary image 622 to generate a human-readable version for mapped binary image 622 (e.g., after intercepting the execution of mapped binary image 622), such as written in assembler language. BIM module 634 may generate binary map 640 from the assembler language version of mapped binary image 622. An exemplary implementation for binary map 640 is illustrated in FIG. 3B (right-hand side). OSA 626 may recompile the assembler language version of mapped binary image 622 to generate alien binary image 642 (e.g., an execution binary image). Alternatively, OSA 626 may directly recompile mapped binary image 622 (e.g., the original binary image) to generate alien binary image 642.

In some embodiments, the original binary image may be recompiled into an execution binary image compatible with the modified execution context. An execution binary image compatible with the modified execution context may include an execution binary image having at least one parameter matching the modified execution context, and/or an execution binary image suitable or adaptable for proper and/or successful execution with the modified execution context. The execution binary image generated by recompiling the original binary image may execute successfully (e.g., compatibly) despite or because of the modifications made to the execution context. In some embodiments, after modifying the execution context, the OSA may receive the map representing the structure of the original binary image as an input, to may ensure compatibility. The OSA may use the map when recompiling the original binary image into the execution binary image to maintain compatibility with the modified execution context. The map may serve as a blueprint for translating the original binary image (e.g., configured for the native execution context), to the execution binary image configured for the alien execution context. In some embodiments, the execution binary image may only be executed by an emulated CPU configured with an alien ISA.

Returning to the Word example, the OSA may modify the execution context for the Word instance by randomly changing the registers and the location in RAM (or other memory) for loading the machine code instructions. The binary image generated by recompiling the original binary image for Word may execute successfully and thus may be compatible with the modified execution context, e.g., using the randomly changed registers and random location in RAM (or other memory).

FIG. 6 illustrates an example of lifter module 636 of OSA 626 configured with system 600 to recompile mapped binary image 622 (e.g., original binary image) into alien binary image 642 (e.g., execution binary image). In some embodiments, lifter module 636 may receive binary map 640 from BIM module 634 via agent loader 630 and may user binary map 640 to recompile mapped binary image 622 into alien binary image 642. Agent loader 630 may use binary map 640 to ensure compatibility between alien binary image 642 and the modified execution context, which may include synthetic CPU 638, which may be operative with an alien ISA.

In some embodiments, the execution binary image may represent a structure of the original binary image. Representing a structure of the original binary image may include having, mirroring, or otherwise expressing, an operation, a memory location, a memory value, a timing, a sequence, functionality, and/or a relationship thereof, any of which may be associated with or is parallel to the original binary image (e.g., associated with or parallel to code represented by the original binary image). In some embodiments, at least one of a datum, an instruction, a register, or a location may be replaced with a corresponding datum, instruction, register, and location associated with the modified execution context. For example, generating a modified execution context may include replacing at least one datum, instruction, register, or location (e.g., memory location). By way of further example, the alien binary image (e.g., execution binary image) may include references to at least some of the data, program code instructions, registers and memory locations referenced by the native binary image (e.g., original binary image). The map may provide a correspondence between the data, program code instructions, registers and memory locations of the alien binary image and the native binary image.

In some embodiments, the computing process may be executed using the execution binary image and the map. Using the execution binary image and the map may include generating code based on the execution binary image (e.g., an instruction), executing code associated with the execution binary image, validating code execution based on the map, ensuring that the execution of the computing process via the execution binary image corresponds to an execution of the computing process via the original binary image (e.g., by using the map as a reference or validator), ensuring that the functionality of the execution binary image corresponds to the functionality of the original binary image (e.g., by using the map as a reference or validator), implementing a code flow integrity technique using the map as an outline of acceptable behavior, or performing any other operation influenced by at least one of the execution binary image or the map, to execute the computing process. In some embodiments, the map may facilitate proper execution of the execution binary image in the modified execution context. For example, the map may assist in locating the correct memory address corresponding to a randomized memory location of the modified execution context (e.g., by providing a reference or otherwise indicating a relationship between memory addresses or locations). As another example, if the modified execution context includes randomized locations in memory, such as for storing machine code instructions, the map may assist in restoring a proper execution sequence for the execution binary image (e.g., by referencing or otherwise indicating mapped locations between the alien and native execution contexts). In a similar manner, the map may assist in correctly referencing data and arguments (e.g., by indicating a relationship between data and/or arguments of the alien and native execution contexts). In general, the map may assist in ensuring that when the execution binary image is executed, instructions, such as read and/or write operations, are executed in a manner that corresponds to a native execution of original binary map inside the native execution context.

Notably, a vulnerability relating to a characteristic inherent to the native execution context may be at least partially eliminated in the modified execution context. For example, an attempt to exploit a specific memory allocation vulnerability may fail under the randomized memory allocation of the modified execution context. Similarly, an attempt to exploit a specific timing or scheduling characteristic of the native execution context may fail in the chaotic runtime environment of the modified execution context.

Returning to the Word example, an attacker may attempt to exploit a memory allocation vulnerability inherent to Word by injecting malicious shell code into a binary image for a runtime instance of Word configured to execute within a native execution context. The OSA may intercept the runtime instance (e.g., prior to execution), and may create a map of the binary image and modify the native execution context. The OSA may then recompile the binary image for Word to create an execution binary image, which may be compatible with the modified execution context. The OSA may then execute the Word instance in the modified execution context using the execution binary image and the map. The map may ensure proper execution of legitimate operations associated with Word. However, the modified execution context may thwart the execution of the injected shell code.

FIG. 6, mentioned above, illustrates an example of OSA 626 executing execution process 620 (e.g., the computing process) using alien binary image 642 (e.g., the execution binary image) and binary map 640 (e.g., the map). Alien binary image 642 may be written using the alien ISA that is compatible with synthetic CPU 638. OSA 626 may load alien binary image 642 into memory 604 according to the (e.g., randomized) memory allocation scheme of the modified execution context. Synthetic CPU 638 may execute alien binary image 642 within the modified execution context using binary map 640 to ensure proper execution of legitimate operations. Notably, an attempt to exploit a vulnerability associated with a predictable aspect of the native execution context may fail.

FIG. 5 illustrates a block diagram of an example process 500 for performing cybersecurity operations, consistent with embodiments of the present disclosure. While the block diagram may be described below in connection with certain implementation embodiments presented in other figures, those implementations are provided for illustrative purposes only, and are not intended to serve as a limitation on the block diagram. As examples of the process are described throughout this disclosure, those aspects are not repeated or are simply summarized in connection with FIG. 5. In some embodiments, the process 500 may be performed by at least one processor (e.g., processor 602 of FIG. 6) of a computing device to perform operations or functions described herein. In some embodiments, some aspects of the process 500 may be implemented as software (e.g., program codes or instructions) that are stored in a memory (e.g., memory 604 in FIG. 6) or a non-transitory computer readable medium. In some embodiments, some aspects of the process 500 may be implemented as hardware (e.g., a specific-purpose circuit). In some embodiments, the process 500 may be implemented as a combination of software and hardware.

FIG. 5 includes process blocks 502 to 510. At block 502, a processing means (e.g., processor 602 of FIG. 6) may determine that an operating system has initiated a computing process, consistent with disclosed embodiments. For example, turning to FIG. 6, kernel agent 628 of OSA 626 may determine that OS 610 has initiated program execution process 620, for example by detecting that program execution process 620 has been loaded into memory 604.

At block 504, the processing means may replace the computing process with a code configured to obtaining a map representing a structure of an original binary image associated with the replaced computing process, consistent with disclosed embodiments. For example, turning to FIG. 6, kernel agent module 128 of OSA 626 may replace program execution process 620 with a code (e.g., associated with OSA 626) configured to obtain (e.g., access, request, retrieve, generate, initialize) binary map 640. Binary map 640 may represent a structure of mapped binary image 622 (e.g., original binary image) associated with program execution process 620 (e.g., replaced by code associated with OSA 626), consistent with disclosed embodiments.

At block 506, the processing means may obtain (e.g., access, request, retrieve, generate, initialize) a modified execution context generated for the computing process. In some embodiments, the modified execution context may include an emulated central processing unit (CPU), consistent with disclosed embodiments. In some embodiments, the modified execution context may include an instruction set associated with the emulated CPU, and the instruction set may be non-native to a hardware processor on which the computing process is run. In some embodiments, the modified execution context may include at least one of randomized registers and randomized memory locations. In some embodiments, the modified execution context may exhibit non-predictability, consistent with disclosed embodiments. Turning to FIG. 6, in some embodiments, OSA 626 may obtain a modified execution context generated for program execution process 620. For example, chaotic generator 632 of OSA 626 may generate the modified execution context. Additionally or alternatively, OSA 626 may retrieve the modified execution context from memory. The modified execution context may include synthetic CPU 638 and an alien ISA associated with synthetic CPU 638. The alien ISA may be non-native to at least one processor 602 on which program execution process 620 is run.

At block 508, the processing means may recompile the original binary image into an execution binary image compatible with the chaotic execution context, consistent with disclosed embodiments. In some embodiments, the execution binary image may represent a structure of the original binary image. Additionally or alternatively, at least one of a datum, an instruction, a register, and a location may be replaced with a corresponding datum, instruction, register, and location associated with the alien execution context. Turning to FIG. 6, lifter module 636 of OSA 626 may recompile mapped binary image 622 (e.g., original binary image) into alien binary image 642 (e.g., execution binary image). Lifter module 636 may recompile mapped binary image 622 to be compatible with the chaotic execution context, such as by being compatible with synthetic CPU 638 and the alien ISA.

At block 510, the processing means may execute the computing process using the execution binary image and the map. For example, the processing means may use code represented by the execution binary image and the computing process, with the map as a validator, to execute the computing process. Turning to FIG. 6, synthetic CPU 638 may execute program execution process 620 using alien binary image 642 and binary map 640.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for cybersecurity systems. Such systems may involve software that enables thwarting of malicious code or other cyber threats. It is intended that one or more aspects of any mechanism may be combined with one or more aspect of any other mechanisms, and such combinations are within the scope of this disclosure.

This disclosure is constructed to provide a basic understanding of a few exemplary embodiments with the understanding that features of the exemplary embodiments may be combined with other disclosed features or may be incorporated into platforms or embodiments not described herein while still remaining within the scope of this disclosure. For convenience, and form of the word "embodiment" as used herein is intended to refer to a single embodiment or multiple embodiments of the disclosure.

Certain embodiments disclosed herein include devices, systems, non-transitory computer readable media, and methods for addressing cyber threats. To avoid repetition, the functionality of some embodiments is described herein solely in connection with a processor or at least one processor. It is to be understood that such exemplary descriptions of functionality apply equally to methods and computer readable media and constitutes a written description of systems, methods, and computer readable media. The underlying platform may allow a user to structure a system, method, or computer readable medium in many ways using building blocks, thereby permitting flexibility in constructing a product that suits desired needs.

Embodiments described herein may involve a non-transitory computer readable medium. A non-transitory computer readable medium may refer to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer readable storage medium" may refer to multiple structures, such as a plurality of memories or computer readable storage mediums located within an input unit or at a remote location. Additionally, one or more computer readable storage mediums can be utilized in implementing a computer-implemented method. Accordingly, the term computer readable storage medium should be understood to include tangible items and exclude carrier waves and transient signals. Thus, non-transitory computer readable media may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine having any suitable architecture. Preferably, the machine may be implemented on a computer platform having hardware such as processing units, such as one or more processors or central processing units ("CPUs"), a memory, and one or more input/output interfaces. The computer platform may also include an operating system and instruction code. The various processes and functions described in this disclosure may be either part of the instruction code or part of the application program, or any combination thereof, which may be executed by a processor/CPU, whether or not such a computer or processor is explicitly shown. In addition, various other peripheral units may be connected to the computer platform such as an additional data storage unit.

Some embodiments may involve at least one processor. A "processor" or "at least one processor" may include any physical device or group of devices having electric circuitry that performs a logic operation on an input or inputs. For example, a processor or at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

It is expected that during the life of a patent maturing from this application many relevant virtualization platforms, virtualization platform environments, trusted cloud platform resources, cloud-based assets, protocols, communication networks, security tokens and authentication credentials will be developed, and the scope of these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although this disclosure presents specific embodiments, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A non-transitory computer readable medium containing instructions that when executed by at least one processor cause the at least one processor to perform cybersecurity operations comprising:

determining that an operating system has initiated a computing process;

replacing the computing process with an executable code configured to create a map representing a structure of an original binary image associated with the replaced computing process;

generating a modified execution context for the replaced computing process, wherein at least one of a datum, an instruction, a register, or a location is replaced with a corresponding datum, instruction, register, and location associated with the modified execution context;

recompiling the original binary image into an execution binary image that includes the map and is compatible with the modified execution context; and executing the replaced computing process using the execution binary image and the map.

2. The non-transitory computer readable medium of claim 1, wherein the modified execution context includes an emulated central processing unit (CPU).

3. The non-transitory computer readable medium of claim 2, wherein the modified execution context includes an instruction set associated with the emulated CPU.

4. The non-transitory computer readable medium of claim 3, wherein the instruction set associated with the emulated CPU is non-native to a hardware processor on which the replaced computing process is run.

5. The non-transitory computer readable medium of claim 1, wherein the modified execution context includes randomized registers.

6. The non-transitory computer readable medium of claim 1, wherein the modified execution context includes randomized memory locations.

7. The non-transitory computer readable medium of claim 1, wherein the modified execution context exhibits non-predictability.

8. The computer readable medium of claim 1, wherein the modified execution context includes random padding of random segments in the code.

9. The computer readable medium of claim 1, wherein the modified execution context includes at least one randomized property of at least one Application Programming Interface.

10. The computer readable medium of claim 1, wherein recompiling the original binary image comprises using the map for maintaining compatibility between the execution binary image and the modified execution context.

11. A method for performing cybersecurity operations comprising:

determining that an operating system has initiated a computing process;

replacing the computing process with an executable configured to obtain a map representing a structure of an original binary image associated with the replaced computing process;

obtaining a modified execution context generated for the replaced computing process, wherein at least one of a datum, an instruction, a register, or a location is replaced with a corresponding datum, instruction, register, and location associated with the modified execution context;

recompiling the original binary image into an execution binary image that includes the map and is compatible with the modified execution context; and executing the replaced computing process using the execution binary image and the map.

12. The method of claim 11, wherein the modified execution context includes an emulated central processing unit (CPU).

13. The method of claim 12, wherein the modified execution context includes an instruction set associated with the emulated CPU, wherein the instruction set is non-native to a hardware processor on which the replaced computing process is run.

14. The method of claim 11, wherein the modified execution context includes at least one of randomized registers or randomized memory locations.

15. The method of claim 11, wherein the modified execution context exhibits non-predictability.

16. A system for performing cybersecurity operations, comprising:

at least one processor configured to:

determine that an operating system has initiated a computing process;

replace the computing process with an executable configured to create a map representing a structure of an original binary image associated with the replaced computing process;

generate a modified execution context for the replaced computing process, wherein at least one of a datum, an instruction, a register, or a location is replaced with a corresponding datum, instruction, register, and location associated with the modified execution context;

recompile the original binary image into an execution binary image that includes the map and is compatible with the modified execution context; and execute the replaced computing process using the execution binary image and the map.

17. The system of claim 16, wherein the modified execution context includes an emulated central processing unit (CPU).

18. The system of claim 17, wherein the modified execution context includes an instruction set associated with the emulated CPU wherein the instruction set is non-native to the at least one processor.

19. The system of claim 16, wherein the modified execution context includes at least one of randomized registers or randomized memory locations.

20. The system of claim 16, wherein the modified execution context exhibits non-predictability.

*     *     *     *     *